May 5, 1931.  C. T. DANIELSON  1,803,463

SAW

Filed Dec. 31, 1928

CARL T. DANIELSON
INVENTOR

PER

*Gust Hjelm*

ATTORNEY

Patented May 5, 1931

1,803,463

UNITED STATES PATENT OFFICE

CARL T. DANIELSON, OF CHICAGO, ILLINOIS

SAW

Application filed December 31, 1928. Serial No. 329,355.

This invention relates to improvements in a combination saw and square, and has for one of its principal objects the provision of a saw particularly for carpenter's use which will provide a combination saw and square, and which will be absolutely accurate so far as the square feature is concerned while at the same time providing a very efficient and satisfactory saw.

One of the important objects of this invention is the provision of a combination saw and square for carpenters which, in addition to the above features, will have a removable handle so that a plurality of combined saw blades and squares may be carried by the carpenter in his tool box to be used with only one handle, thereby eliminating the objectionable bulkiness caused by the transportation of a number of saws as has heretofore been considered necessary.

Still another and further important object of this invention is the provision in a combination saw blade and square for carpenters of a plurality of lines indicating angles, thereby enabling the accurate cutting of material along such angles whenever desired or necessary.

Other and further important objects of the invention will be apparent from the disclosures in the accompanying drawings and following specification.

The invention, in a preferred form, is illustrated in the drawings and hereinafter more fully described.

Figure 1:
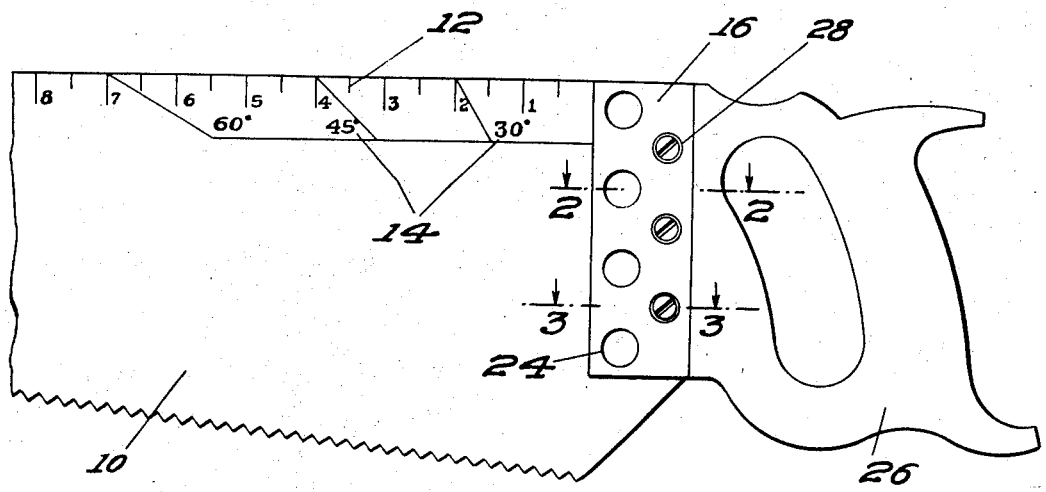
Figure 1 is an elevation of the improved combination saw and square of this invention.

The reference numeral 10 indicates generally a saw blade, the teeth of which may be for any purpose, and it will also be evident that the dimensions of the blade are not particularly limited. Along the upper edge of the blade as shown at 12 is a plurality of markings indicating a scale such as inches, centimeters, or the like, and this scale also includes a plurality of lines drawn at angles with corresponding indicia accompanying the same, such as 30°, 45°, 60°, etc., as best illustrated at 14. It will be evident that other and further angular dimensions may be readily included in this scale.

Figures 2, 3:
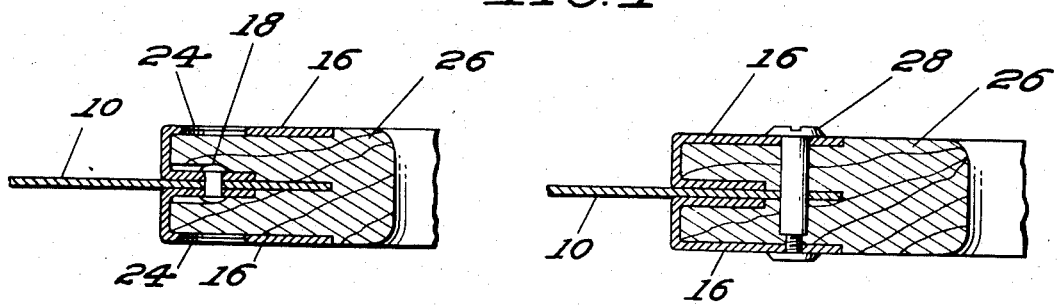
Figure 2 is a sectional view taken on the line 2—2 of Figure 1, looking in the direction indicated by arrows.
Figure 3 is a sectional view taken on the line 3—3 of Figure 1, looking in the direction indicated.
Figure 4:
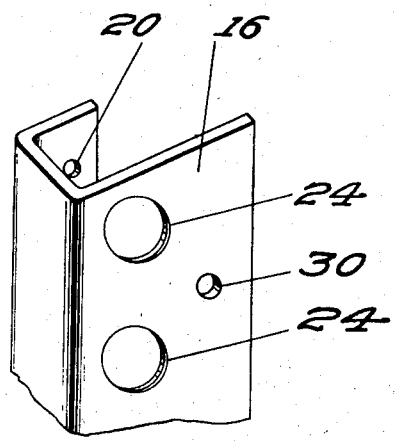
Figure 4 is a perspective view of one side of the square attachment for the blade.
Figure 5:
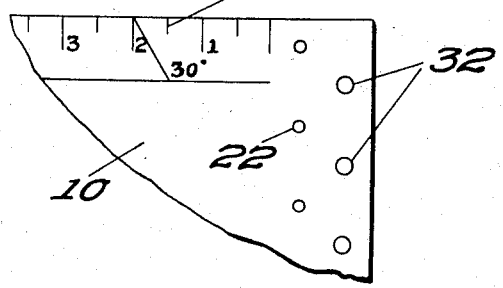
Figure 5 is a detail view of one corner of the saw blade, illustrating particularly the attaching means.

A 90° angle is formed by the junction of the handle attaching means 16 to the plate 10, this handle attaching means comprising chiefly a pair of U-shaped elements, one of which is best shown in partial perspective in Figure 4, and which are attached to the saw blade 10 by means of rivets 18 as best shown in Figure 2. These rivets pass through openings 20 in the members 16 which in turn are aligned with openings 22 in the blade 10 as shown in Figure 5.

In order to allow of the proper insertion and attachment of the rivets 18, a corresponding series of openings 24 is formed in the members 16. These are best shown in Figures 2 and 4, and are for the purpose of allowing of the ready insertion of the rivets, and also of the insertion and operation of riveting devices.

After these members are assembled, a saw handle 26 which can be of wood or similar material, and which is cut to fit into the assembled elements 10 and 16 is inserted therein, as best shown in Figures 2 and 3, and the same is then firmly attached to the blade 10 and to the elements 16 by means of a plurality of screws 28 which are preferably constructed as shown in Figure 3, but which may be of other desired construction so long as a satisfactory attaching means is provided. These screws pass through openings 30 in the members 16 and corresponding aligned openings 32 in the saw blade 10, similarly positioned openings being provided in the material of the handle 26.

It will be seen that herein is provided a combination saw, square, and angle indicating device which will be of great use to carpenters, combining in a single unitary tool the advantages of two or three tools, and from which moreover the handle may be readily detached, so that a plurality of blades may be used with one handle, and so that the handle may be also readily replaced in the event of breakage or damage.

At the same time, a positive unchangeable connection is maintained between the straight-edges of the device so that an accurate 90° angle is always available for instant use. The original alignment of the openings 20 and 22, and the subsequent riveting of the parts 10 and 16 together insure the right-angle attachment without fear or possibility of variation.

I am aware that many changes may be made and numerous details of construction varied throughout a wide range without departing from the principles of this invention, and I therefore do not purpose limiting the patent granted hereon otherwise than as necessitated by the prior art.

I claim as my invention:

A saw, including a saw blade, a handle thereon, and means for attaching the handle to the blade, said means comprising metallic shoulders for the handle, said metallic shoulders comprising a pair of channel members, the blade and the channel members having aligned openings, and rivets positioned in the openings, the channel members being provided with additional outside openings for the ready insertion of the said rivets, and a handle removably positioned with respect to the blade and shoulders, together with a plurality of double screws for mounting the handle on the shoulders and blade.

In testimony whereof I affix my signature.

CARL T. DANIELSON.